United States Patent
Wexel et al.

(10) Patent No.: US 8,313,871 B2
(45) Date of Patent: Nov. 20, 2012

(54) FUEL CELL HEATING

(75) Inventors: Dirk Wexel, Mainz (DE); Jurgen Thyroff, Harxheim (DE); Bernd Peter Elgas, Hilbersheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 854 days.

(21) Appl. No.: 11/562,620

(22) Filed: Nov. 22, 2006

(65) Prior Publication Data

US 2008/0118787 A1 May 22, 2008

(51) Int. Cl.
*H01M 8/04* (2006.01)

(52) U.S. Cl. .................. 429/433; 429/428; 429/429

(58) Field of Classification Search .............. 429/13, 429/24, 26, 34, 428, 429, 433
See application file for complete search history.

(56) References Cited

U.S. PATENT DOCUMENTS

| | | | |
|---|---|---|---|
| 4,272,353 A | 6/1981 | Lawrance et al. | |
| 5,132,174 A * | 7/1992 | Romanowski et al. | 429/434 |
| 6,656,304 B2 | 12/2003 | Furuta et al. | |
| 6,686,080 B2 * | 2/2004 | Farkash et al. | 429/434 |
| 6,773,841 B2 | 8/2004 | Rapaport et al. | |
| 6,986,958 B2 * | 1/2006 | Reiser et al. | 429/429 |
| 7,264,895 B2 * | 9/2007 | White | 429/436 |
| 7,759,010 B2 * | 7/2010 | Hoch | 429/437 |
| 2003/0087139 A1 * | 5/2003 | White | 429/24 |

* cited by examiner

*Primary Examiner* — Melvin C Mayes
*Assistant Examiner* — Colette Nguyen
(74) *Attorney, Agent, or Firm* — BrooksGroup

(57) ABSTRACT

One embodiment of the invention includes a product comprising a fuel cell stack comprising at least one coolant header, and at least one heater at least partially disposed in the at least one coolant header.

18 Claims, 4 Drawing Sheets

FUEL CELL HEATING

TECHNICAL FIELD

The field to which the disclosure generally relates includes fuel cell stacks, and to heating of fuel cell stacks.

BACKGROUND

Fuel cell stacks have been known to include heating elements integrated in end plates of the stacks. The heating elements generate heat by resisting electrical current received from an independent electrical power supply. Accordingly, such resistive heating elements selectively heat endmost fuel cells, but not other fuel cells, of the stack.

SUMMARY OF EXEMPLARY EMBODIMENTS OF THE INVENTION

One embodiment of the invention includes a product comprising a fuel cell stack comprising at least one coolant header, and at least one heater at least partially disposed in the at least one coolant header.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings.

DETAILED DESCRIPTION OF EXEMPLARY EMBODIMENTS

The following description of the embodiments is merely exemplary in nature and is in no way intended to limit the invention, its application, or uses.

In general, it is sometimes beneficial to heat a fuel cell stack, such as during low power operation of a fuel cell stack, or when operating a stack in low ambient temperature conditions, or at startup and warm-up of a fuel cell stack. For startability and good performance of a fuel cell stack, the stack is generally warmed up to meet load demands.

Figure 1:
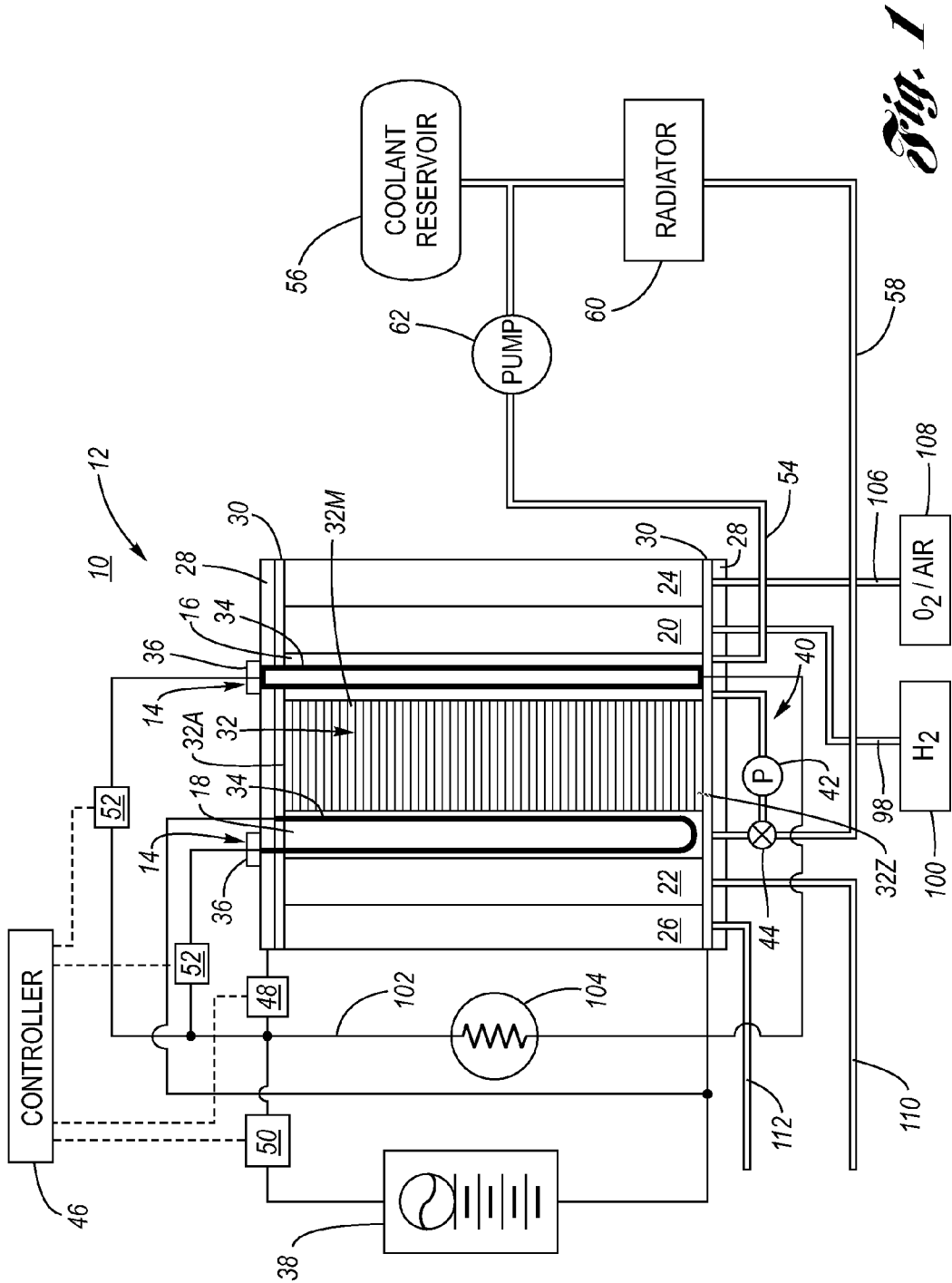
FIG. 1 is a schematic representation of an exemplary fuel cell system.

Therefore, and referring now to FIG. 1, an exemplary fuel cell system 10 is schematically illustrated and includes an exemplary fuel cell stack 12 that includes one or more heaters 14 at least partially disposed in one or more coolant headers 16, 18 of the stack 12. Any suitable quantity of coolant headers 16, 18 may be provided with coolant to help cool and/or heat the stack 12. As used herein, the term coolant may include any suitable fluid medium used for cooling and/or heating a fuel cell stack or any portion(s) thereof.

The fuel cell stack 12 may also include fuel supply and return headers 20, 22, and oxidant supply and return headers 24, 26. The stack 12 may further include clamping plates 28, current collector plates 30, and one or more fuel cells therebetween 32. The headers 16, 18, 20, 22, 24, 26 may be disposed adjacent to the fuel cells 32 to respectively deliver coolant, fuel, and oxidant fluids to and from the fuel cells 32. Those skilled in the art will recognize that suitable passages (not shown) may be provided between the headers 16, 18, 20, 22, 24, 26 and the fuel cells 32 to convey respective fluids to the fuel cells 32.

The heaters 14 may be used for heating the coolant within the coolant headers 16, 18 to heat the fuel cells 32 from a close, adjacent location. The heaters 14 are at least partially disposed in either or both of the coolant supply or return headers 16, 18. As shown, the heaters 14 may extend substantially the length of the headers 16, 18. Further, the heaters 14 may extend substantially the length of the fuel cell stack 12, such as between the clamping plates 28 as shown in coolant header 16. Any suitable number of heaters 14 may be provided in the headers 16, 18. For example, one of the headers may include one heater, both headers may each include one heater, one header may include one heater while the other includes multiple heaters, or both headers may include multiple heaters, or the like.

The heaters 14 may include one or more heating elements 34 substantially disposed in either or both of the coolant supply or return headers 16, 18. The heating elements 34 may be any suitable type of heating elements and, for example, may include resistance heating elements such as immersion elements suitable for direct immersion in the coolant or as a source of conducted, convected, or radiant heat. Resistance heating elements may be supplied in straight lengths in an annealed condition and may be formed into complex shapes using simple bending tools. For example, a U-shaped resistance heating element is shown disposed in the coolant return header 18 and a straight rod resistance heating element is shown disposed in the coolant supply header 16. The resistance heating elements may be composed of an INCOLOY nickel-iron-chromium alloy, and may be brazed or mounted with compression fittings to suitable supports/flanges (not shown) of the fuel cell stack 12. Exemplary resistance heating elements are available from RS Components of United Kingdom or Germany, RS Stock no. 200-1229, Redring manufacturer part no. 72400127.

The heaters 14 may regulate their own temperature output. For example, the heaters 14 may include one or more current limiting devices 36 electrically connected to the heating elements 34 to automatically switch on and off the flow of electricity to the heating elements 34. The current limiting devices 36 may be carried in any suitable manner in any suitable location by the stack 12. The current limiting devices 36 may include any suitable device(s) for reducing, stopping, or otherwise controlling the flow of current to the heating elements 34, such as thermostats, thermistors, or the like. Such current limiting devices 36 may have temperature setpoints according to which the current limiting devices 36 either permit or prevent flow of electrical current to the heating elements 34. For example, when the fuel cell stack 12 temperature increases to a setpoint temperature of the current limiting device 36, the current limiting device 36 may shut off flow of current to its respective heating element 34.

The temperature setpoints may be preset in accordance with properties of the current limiting device 36, such as the shape, size, and composition of a bimetallic coil in the case of a bimetallic switch device. This enables the heaters 14 to automatically regulate their operation without external controls such that the heaters 14 are self-regulating devices. Accordingly, the heaters 14 enable the temperature of the fuel cell stack 12 to be automatically maintained at or above a desired temperature.

For example, the current limiting devices 36 may include a bimetallic thermostat device including a bimetallic coil. The bimetallic coil may be made by uniting strips of two different types of metal that expand or contract in size when they are heated or cooled. Each type of metal expands at its own specific rate, and the two metals, such as iron and copper, are selected so that the rate of expansion or contraction are not the same. Thus, as the bimetallic coil cools, the metal layer on the inside of the coil contracts faster than the metal layer on the outside of the coil and, hence, the coil winds up. As the coil winds, a circuit is completed by a switch attached to the coil, wherein current is allowed to conduct from a power supply to the heating elements 34. Conversely, as the temperature rises, the metal layer on the inside of the coil expands faster than the metal layer on the outside of the coil and, hence, the coil unwinds. As the coil unwinds, the circuit opens and current is prevented from conducting to the heating elements 34. An exemplary bimetallic device is available from RS Components of United Kingdom or Germany, RS Stock no. 228-2636, Elmwood brand manufacturer part no. 2455R 9082-462 L50C available from Honeywell of Pawtucket, R.I., U.S.

In another example, the current limiting devices 36 may include a thermistor, which is a thermal type of resistor whose resistance changes as a function of temperature in accordance with a thermal coefficient. Thermistors may be classified into two types depending on the sign of the thermal coefficient. If the coefficient is positive, then resistance increases with increasing temperature, and the device is called a positive temperature coefficient (PTC) thermistor, or posistor. If, however, the coefficient is negative, then resistance decreases with increasing temperature, and the device is called a negative temperature coefficient (NTC) thermistor.

The heaters 14 may include PTC type thermistors that exhibit pure PTC properties, or PTC and NTC properties. As a voltage is applied across a pure PTC thermistor, current flows therethrough and the output temperature of the PTC heating element increases. But many PTC thermistors are also designed to exhibit initial NTC properties wherein resistance decreases as current initially flows through the thermistor. This decreasing resistance, in turn, causes an increase in current flow through the thermistor, thereby resulting in additional heat output. After this initial period of decreasing resistance and increasing temperature, the thermistor ultimately exhibits PTC properties wherein resistance begins to increase sharply above a certain temperature. Accordingly, as the temperature rises, the resistance of the PTC thermistor also sharply increases to a certain temperature setpoint where the PTC thermistor effectively no longer conducts current therethrough. In other words, the PTC thermistor is self-regulating in that it effectively switches itself off.

Moreover, the heaters 14 may include PTC heaters comprised of PTC heating elements that effectively integrate PTC thermistors with resistance heating elements. In other words, the heaters 14 may be PTC heaters that exhibit pure PTC properties or PTC and NTC properties.

The heaters 14 may be used to regulate the temperature of the fuel cell stack to any suitable temperature(s), such as in an exemplary range of 0° C. to 80° C. and, more particularly, between 50° C. to 70° C. with an exemplary target of 60° C. Moreover, where multiple heaters 14 are used either in one or both of the headers 16, 18, each heater 14 may have its own temperature setpoint, to enable increases in the temperature of the fuel cell stack 12 in a stepwise manner to correspond to different load points.

The heaters 14 may be part of a fuel cell heating system, which may also include any suitable power supply for providing electricity to the heaters 14. In a first power supply example, a power supply 38 may include an alternating current (AC) power source such as 180-450 VAC utility power and/or a DC power source such as a 12 VDC vehicle battery. As shown in dashed lines, electrical connection may be made between the power supply 38 and the heaters 14 in any suitable manner, including a switched connection.

In a second power supply example, the fuel stack 12 itself may instead or also serve as the power supply. The fuel stack 12 has electrical power outputs such as the current collector plates 30. Also, as shown in solid lines, electrical connection may be made between the current collector plates 30 and the heating elements 34. Use of the fuel stack 12 as the power supply enables relatively short power wiring, minimization or elimination of controls if the heaters 14 are self-regulating, and fewer components and less weight. Also, any suitable power conditioning, regulating, or inverting equipment (not shown) may be interposed between the heaters 14 and the power supply(ies).

The heating system may further include a coolant header recirculation path 40 between the coolant headers 16, 18. The recirculation path 40 may shunt a cooling system (described below) and thereby provide a relatively smaller quantity of coolant to be heated within the fuel cell stack 12. In the recirculation path 40, the heating system may also include a pump 42 for delivering coolant from the coolant return header 18 to the coolant supply header 16, and a recirculation valve 44 to divert the coolant away from the cooling system, and from the coolant return header 18 to the pump 40. The pump 42 and the valve 44 may be configured for variable output and may be powered in any suitable fashion, such as from the stack electrical output, or the power supply 38 (power connections not shown). Similarly, the pump 42 and valve 44 may be controlled in any suitable fashion. For example, the heating system may also include any suitable controller such as a controller 46 in communication with the pump 42 and valve 44 (control connections not shown). The controller 46 may be a vehicle or fuel cell controller, dedicated heating system controller, or the like.

The controller 46 may also be communicated to any of the following switches suitable for enhancing operation of the heating system. For example, a fuel cell output switch 48 may be provided across the stack electrical output, a power supply switch 50 may be provided in series with the power supply 38, and heater switches 52 may be provided in series with the heaters 14. The controller 46 may include a processor, and one or more memory elements in communication with the processor (not shown). The memory may be configured to provide at least temporary storage of data and computer-readable instructions, which may provide at least some of the functionality of the system 10 and that may be executed by the processor.

The heating system may operate in multiple modes. In an automatic mode, the heaters 14 are not externally directly controlled. Rather, the heaters 14 are provided in continuous electrical communication with the output of the fuel cell stack 12 and are preset with suitable temperature setpoints. The heaters 14 may automatically, substantially cease producing heat when their temperatures reach their respective setpoints. In a fuel cell driven mode, the controller 46 may be programmed to close the fuel cell output switch 48 and open the power supply switch 50 to direct power to the heaters 14.

Conversely, in a power supply driven mode, the controller 46 may be programmed to open the fuel cell output switch 48 and close the power supply switch 50 to direct power to the heaters 14. Also, if the heater switches 52 are used, the controller 46 may be programmed to close them and enable full stack output power, or may enable variable power by operating the switches 52 in an on/off modulated fashion, such as where the switches 52 are pulse-width-modulated (PWM) types of switches, or the like. Moreover, the controller 46 may be programmed to control the switches 52 to independently control operation of the heaters 14, such as to enable operation of one heater and disable operation of the other, or to vary operation of multiple heaters independently of one another. Similarly, where more than one heater 14 is used in one of the headers 16, 18, one of the switches 52 may be provided for each heater 14 and the controller 46 may be programmed to independently control operation of such additional heaters 14.

The controller 46 may also be communicated to the pump 42 and the valve 44 to further enhance operation of the heating system 40 (connections not shown). The controller 46 may be programmed to close or restrict the recirculation valve 44 to direct coolant to the pump 42, and to adjust the output of the recirculation pump 42 in any suitable fashion. Accordingly, the valve 44 and pump 42 recirculate a relatively small volume of coolant through the fuel cell stack 12 and recirculation path 40, compared to a relatively large volume of coolant that is normally directed through the fuel cell stack 12 by the cooling system.

The fuel cell system 10 may also include the previously mentioned cooling system, which may be operable to remove heat from coolant and to circulate the coolant through the fuel cell stack 12 to remove heat from the stack 12. The cooling system may generally include coolant supply plumbing 54, a coolant source 56, coolant return plumbing 58, a coolant heat exchanger 60 in communication between the coolant source 56 and coolant return header 18, and a pump 62 in communication between the source 56 and heat exchanger 60 and the coolant supply header 16 via the coolant supply plumbing 54. The pump 62 may be operable to cause coolant to flow into the coolant header 16 and through the fuel cells 32 to remove heat therefrom. The coolant that flows through the fuel cells 32 may flow through the coolant return header 18 into the coolant return plumbing 58. The coolant within the coolant return plumbing 58 may be routed to the heat exchanger 60 wherein heat is removed from the coolant flowing therethrough. An outlet of the heat exchanger 60 may communicate with an inlet of the pump 62 to allow the coolant to be recirculated back to the fuel cell stack 12.

Those skilled in the art will recognize that any suitable cooling system may be used instead of or in addition to the exemplary cooling system described herein. For example, any suitable refrigeration type of cooling system and related components could be used to cool the coolant. Moreover, the coolant may be used for more than just cooling the fuel cell stack 12 and, in fact, may be used to heat the stack 12 in conjunction with one or more of the heaters 14 described above.

As will be understood from the system description above, the present fuel cell heating configuration provides localized heating in fuel stack header(s). This configuration is efficient because heating losses are minimized by placing a heating source closer to a heating destination. In other words, the heat path from the heaters 14 to the fuel cells 32 is relatively short. Also, the present configuration provides a relatively small heating package because no additional external heating and distribution systems are needed, and because the present configuration may fit within an existing fuel cell stack and does not require adding plates to the stack.

Figure 2:
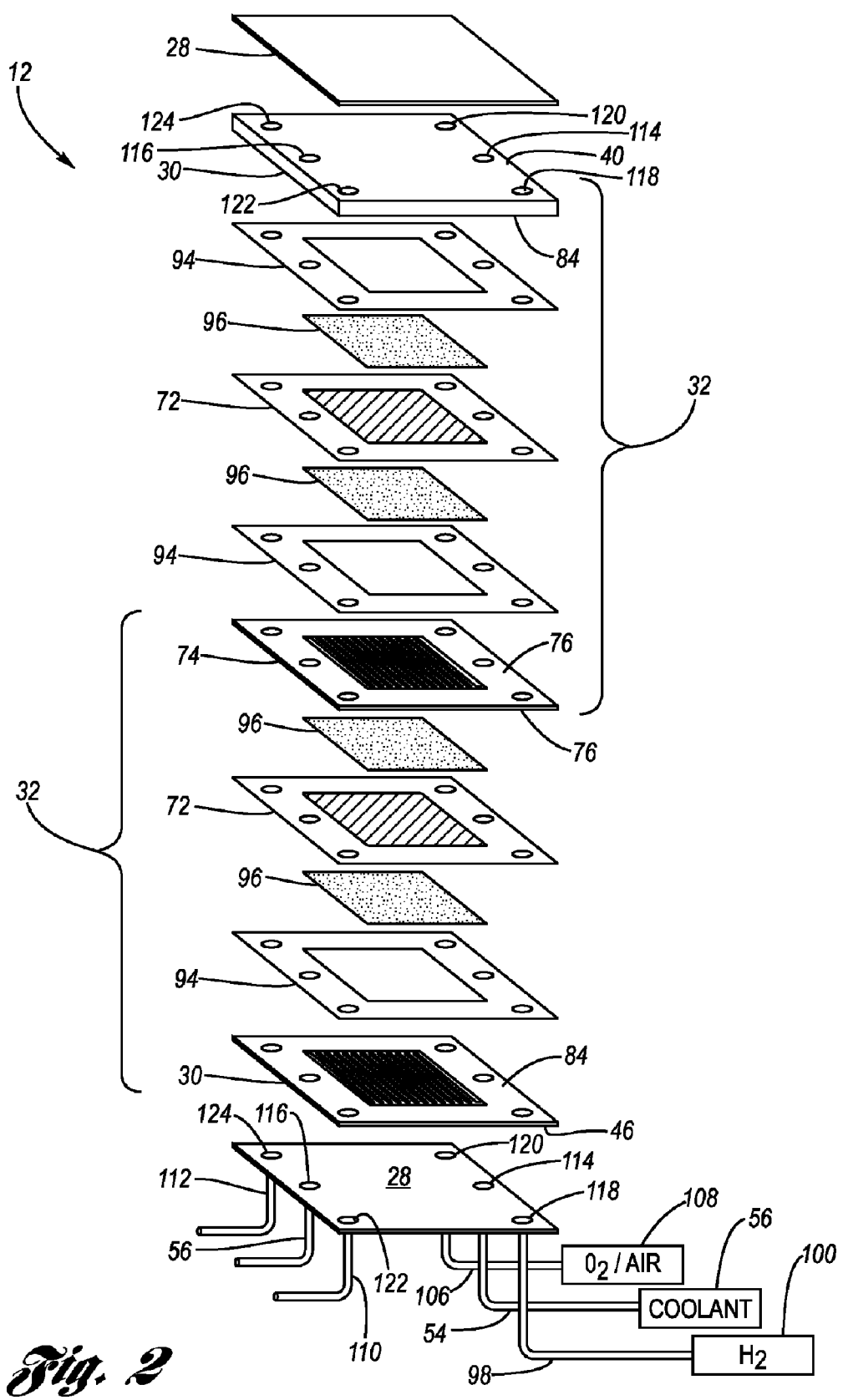
FIG. 2 is an exploded perspective view of an exemplary fuel cell stack that may be used in the fuel cell system of FIG. 1.
Figure 3:
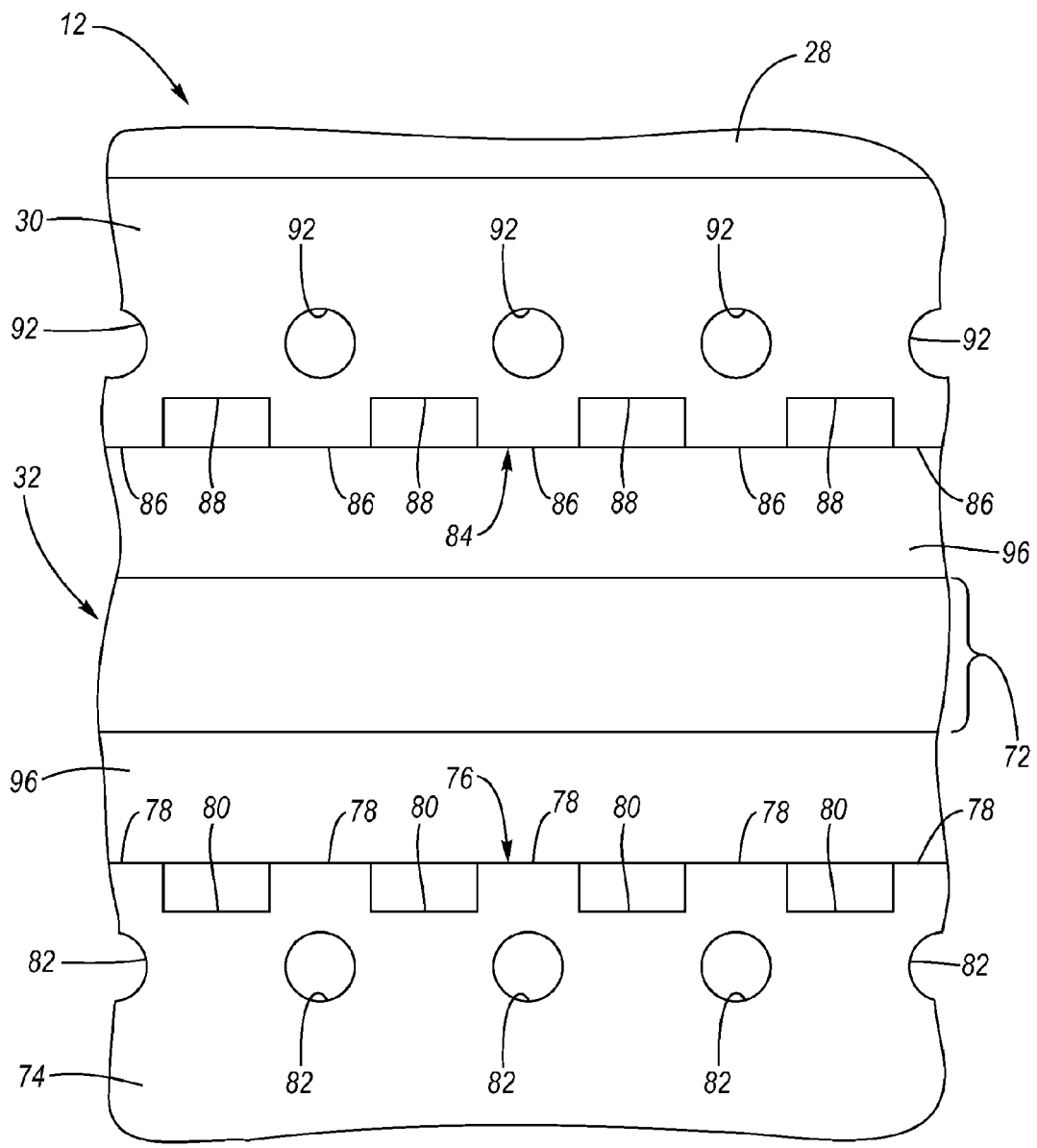
FIG. 3 is a cross-sectional view of a portion of the fuel cell stack of FIG. 2.

Referring now to FIGS. 1 through 3, exemplary structure and operation of the exemplary fuel cell stack 12 will be described. As shown in FIG. 1, the stack 12 may include the plurality of exemplary fuel cells 32 arranged relative to one another in a stacked configuration. The fuel cells 32 may be stacked in series as shown to generate relatively greater voltage output, because the voltage generated by a single fuel cell may be relatively small. The fuel cells 32 may include endmost fuel cells 32A, 32Z and at least one intermediate fuel cell therebetween 32M. The stack 12 may include any suitable number of stacked fuel cells 32 and, as just one of an infinite number of examples, the stack 12 could include 200 fuel cells including two opposed endmost fuel cells and 198 intermediate fuel cells therebetween.

The fuel cell stack 12 may include the clamping plates 30, which may be used to sandwich the fuel cells 32 therebetween. Those skilled in the art will recognize that the stack 12 may be clamped together using the clamping plates 30 and any suitable fasteners (not shown) and fastening configuration, and/or may be supported in any suitable manner such as in a housing or frame (not shown).

Referring now to FIGS. 2 and 3, the fuel cell stack 12 may also include a pair of membrane electrode assemblies (MEAs) 72. The MEAs 72 may include an ionic conductor such as a polyelectrolyte membrane (not shown) positioned between opposed electrodes (not shown). Separate chemical reactions occur at the opposed electrodes, which may include anodes for contact with the fuel and cathodes for contact with the oxidant. The MEA membrane allows ions to pass therethrough from one electrode to the other but blocks flow of electrons.

The fuel cell stack 12 may further include one or more bipolar flow plates 74, which may be electrically conductive, liquid-cooled, and wherein one bipolar flow plate 74 is positioned between the MEAs 72. The bipolar flow plate 74 may include opposed faces 76 wherein each face 76 respectively may face one of the MEAs 72. The bipolar flow plate 74 conducts electricity and reactant fluid, wherein the faces 76 may include a plurality of lands 78 adjacent to grooves or channels 80 to form flow fields for distributing reactants to the MEAs 72. The bipolar flow plate 74 may also include coolant passages 82 formed therein for carrying any suitable fuel cell coolant to cool, or heat, the fuel cell stack 12 including the fuel cells 32.

The stack 12 may additionally include the current collector or polar flow plates 30, which may be electrically conductive, liquid-cooled, and positioned between the clamping plates 28. Like the bipolar flow plate 74, the polar flow plates 30 conduct electricity and reactant fluid, and may include faces 84, which may have a plurality of lands 86 adjacent to grooves or channels 88 to form flow fields for distributing reactants to the MEAs 72. Opposite faces 90 of the respective polar flow plates 30 may be configured so that reactant fluids do not flow therethrough. The polar flow plates 30 may also include coolant passages 92 formed therein for carrying coolant to cool, or heat, the fuel cell stack 12.

Referring to FIG. 2, the stack 12 may also include nonconductive gaskets 94 to provide fluid seals and/or electrical insulation between the several components of the fuel cell stack 12. The flow plates 30, 74 may make contact with the compressible gasket material, thus producing a suitable barrier to gas leakage.

Referring to FIGS. 2 and 3, the stack 12 may also include gas-permeable conductive diffusion media (GDM) 96, which may press against the electrode faces of the MEAs 72 and may be placed between the flow plates 30, 74 to provide a conductive pathway therebetween. The GDM 96 may receive reactant fluid from an adjacent flow plate and uniformly disperse the reactant fluid over the surface of an adjacent MEA.

Those skilled in the art recognize that the fuel stack 12 may also include any other suitable components for enhancing the operation of the fuel cell stack 12. For example, microporous layers (not shown) may be disposed between the GDM 96 and MEAs 72. Also, electrical insulation layers (not shown) may be placed between different components such as the polar flow plates 30 and respective clamping plates 30.

Referring again to FIGS. 1 and 2, the fuel cell stack 12 generally facilitates an internal chemical reaction to convert externally supplied energy in the form of chemical reactants such as a fuel and an oxidant into chemical by-products and electricity such as direct current (DC) electrical power.

A pressurized fuel such as hydrogen may be supplied to the fuel cell stack 12 via appropriate fuel supply plumbing 98 from a fuel source 100, such as a storage tank, a methanol or gasoline reformer, or the like. The pressurized fuel enters the fuel supply header 20 of the stack 12 and flows through suitable passages (not shown) to anode flow fields of the fuel cells 32. The fuel may be channeled through the flow plates 30, 74 and, under pressurization, diffuses through the GDM 94 and contacts porous catalytic anodes of the fuel cells 32.

The fuel dissociates at the catalytic anodes to produce protons, electrons, and heat. The protons produced at the anodes are conducted through the membranes to the cathodes. The electrons may flow from the anode to the flow plate and to cathode of an adjacent fuel cell. The electrons may also flow from bipolar plate to bipolar plate and, ultimately, to one of the current collector plates 30 and out of the stack 12. Accordingly, the fuel cells 32 create an electrical current output. The electrons flow out of the fuel cell stack 12 through an electrical flow path 102 to an electrical load 104 to do useful work en route to the cathode sides of the fuel cells 32 where oxidation reactions take place.

A pressurized oxidant may be supplied via appropriate oxidant supply plumbing 106 to cathode flow fields of the fuel cells 32 within the fuel cell stack 12 from an oxidant source 108, such as a storage tank, an ambient air source, or the like. The pressurized oxidant enters the oxidant supply header 24 of the stack 12 and flows through suitable passages (not shown) to cathode flow fields of the fuel cells 32. The oxidant may be channeled through the flow plates 30, 74 and, under pressurization, diffuses through the GDM 96 and contacts porous catalytic cathodes of the fuel cells 32. The cathodes catalyze the production of water from the supplied oxidant, the protons migrating through the MEA's, and electrons flowing back to the stack 12 from the load 104.

Resultant anode and cathode effluents may be removed from the fuel cell stack 12 in any suitable manner. For example, excess fuel flows away from the anode sides of the fuel cells 32 and may be recycled through the stack 12 or back to the fuel source 100. Likewise, water flows away from the cathode sides of the fuel cells 32 and may be discharged. Accordingly, return plumbing 110, 112 for anode and cathode effluents produced in the respective anode and cathode flow fields of fuel cell stack 12 may be provided.

Heat is generated by the reactions in the fuel cells 32 and may be removed by coolant flowing through the flow plates 30, 74. Accordingly, the coolant supply plumbing 54 may be provided for circulating coolant from the coolant source 56 through the fuel cell stack 12 and out the coolant return plumbing 58.

Referring to FIG. 2, the coolant supply and return plumbing 54, 58 may communicate with coolant apertures 114, 116 in the various components of the fuel cell stack 12. Similarly, the anode and cathode supply and return plumbing 98, 106, 110, 112 may be communicated with anode and cathode apertures 118, 120, 122, 124 in the various components of the fuel cell stack 12. The apertures 114, 116, 118, 120, 122, 124 are enumerated in FIG. 2 in one of the clamping plates 28 and in one of the flow plates 30, but may also be included in at least the following additional fuel cell stack components: the MEAs 72, gaskets 94, bipolar flow plate(s) 74, and other polar flow plate(s) 30. The apertures 114, 116, 118, 120, 122, 124 may substantially align to respectively define the coolant and reactant supply and return headers 16, 18, 20, 22, 24, 26, which generally extend alongside the fuel cells 32.

Figure 4:
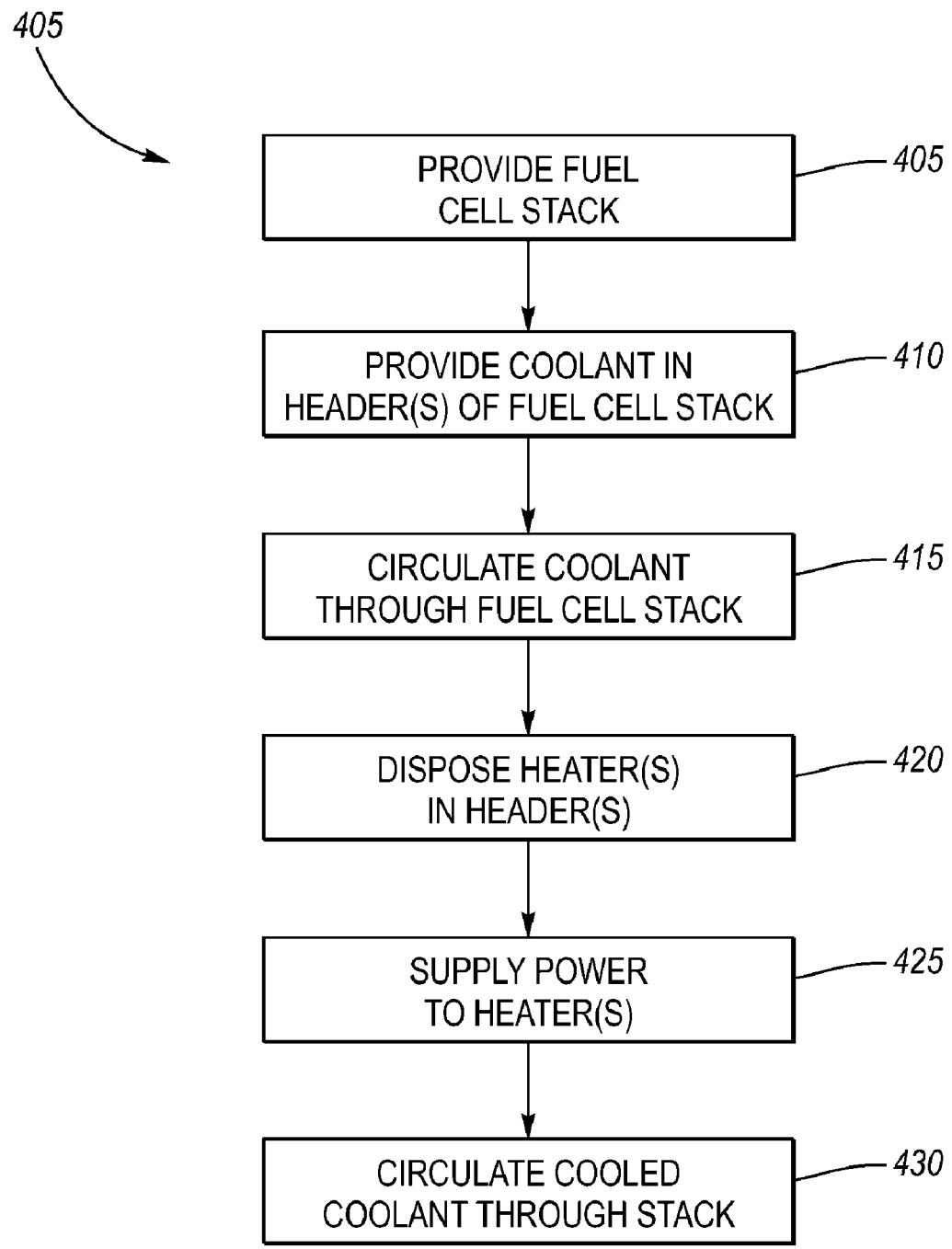
FIG. 4 is a flow chart of an exemplary method of operating a fuel cell system.

FIG. 4 illustrates an exemplary method 400 of operating a fuel cell stack and/or fuel cell system that may be carried out using any suitable apparatus and system. For example, the system 10 and apparatus of FIGS. 1 through 3 may be used in whole or in part.

In step 405, a fuel cell stack is provided that includes at least one coolant header. For example, the fuel cell stack 12 of FIGS. 1 and 2 may be provided including one or more of the coolant headers 16, 18.

In step 410, at least one coolant header of a fuel cell stack may be provided with a quantity of coolant therein. For example, one or both of the headers 16, 18 of the fuel cell stack 12 of FIG. 1 may be at least partially filled with coolant.

In step 415, coolant may be circulated through a fuel cell stack in any suitable manner. In a first example, any suitable pump and plumbing, such as the pump 62 and plumbing 54, 58 of the cooling system of FIG. 1, may be used to circulate the coolant into the fuel cell stack 12 through its coolant supply header 16, its fuel cells 32, and its coolant return header 18, and out of the fuel cell stack 12. In a second example, any suitable recirculation apparatus, such as the recirculation path 40, pump 42, and valve 44 of FIG. 1, may be used to circulate the coolant through the fuel cell stack 12 including its coolant supply header 16, its fuel cells 32, and its coolant return header 18. Using the relatively small closed-loop recirculation path 40 to circulate coolant through the fuel cell stack 12 may be particularly useful when fuel cell heating is carried out for cold start and rapid warm up of the stack 12.

In step 420, one or more heaters are disposed at least partially in at least one coolant header of a fuel cell stack. For example, the heaters 14 of FIG. 1 may be at least partially disposed in one or more of the headers 16, 18 of the fuel cell stack 12 between the clamping plates 32, 34.

In step 425, power may be supplied to one or more heaters in one or more coolant headers in a fuel cell stack in any suitable manner. In a first example, the one or more heaters 14 may be supplied with electrical power from the fuel cell stack 12 itself, as described above with respect to FIG. 1. In a second example, the one or more heaters 14 may be supplied with electrical power from a separate power supply, such as the power supply 38 of FIG. 1.

In step 430, coolant may be cooled and circulated through a fuel cell stack when a supply of power to one or more heaters in one or more headers of a fuel cell stack is stopped. For example, when the heaters 14 of the fuel cell system 10 of FIG. 1 reach their setpoint temperature(s), the cooling system of FIG. 1 may be used to cool the coolant.

The above description of embodiments of the invention is merely exemplary in nature and, thus, variations thereof are not to be regarded as a departure from the spirit and scope of the invention.

What is claimed is:

1. A product comprising:
a fuel cell stack comprising a plurality of fuel cells and a supply coolant header and a return coolant header immediately adjacent said plurality of fuel cells, said supply coolant header extending a length to at least partially cover one side of said plurality of fuel cells, said return coolant header extending a length to at least partially cover another side of said plurality of fuel cells, said supply and return coolant headers being constructed and arranged to deliver coolant fluid to or from said plurality of fuel cells; and
a first heater comprising a first heating element at least partially disposed in said supply coolant header adjacent said plurality of fuel cells, and a second heater comprising a second heating element at least partially disposed in said return coolant header adjacent said plurality of fuel cells.

2. The product of claim 1 wherein said first and second heaters are at least one self-regulating heater.

3. The product of claim 2 wherein the at least one self-regulating heater is at least one PTC heater.

4. The product of claim 1 wherein said first and second heaters extends substantially the length of said respective coolant header.

5. The product of claim 1 wherein said first and second heating elements comprises a resistance heating element.

6. The product of claim 5 wherein the resistance heating element comprises a U-shaped element.

7. The product of claim 5 wherein the resistance heating element comprises a straight rod shaped element extending substantially the length of the at least one coolant header.

8. The product of claim 5 wherein said first and second heaters comprises a current-limiting device.

9. The product of claim 8 wherein the current limiting device comprises at least one of a thermostat or a thermistor.

10. The product of claim 9 wherein the thermistor is a PTC thermistor.

11. The product of claim 1 wherein the product further comprises a recirculation path between the coolant supply and return headers.

12. The product of claim 11 further comprising a recirculation valve and pump in the recirculation path.

13. The product of claim 1 wherein the plurality of fuel cells include endmost fuel cells and at least one intermediate fuel cell therebetween.

14. The product of claim 13 wherein the plurality of fuel cells comprises a plurality of components having a plurality of apertures defining said supply and return coolant headers.

15. A system comprising:
a fuel cell stack including a plurality of fuel cells and supply and return coolant headers immediately adjacent a side said plurality of fuel cells; and
a heating system to heat the coolant in said supply and return coolant headers of said fuel cell stack, said supply coolant header extending a length to at least partially cover one side of said plurality of fuel cells, said return coolant header extending a length to at least partially cover another side of said plurality of fuel cells, said heating system comprising a first heater comprising a first heating element disposed at least partially in said supply coolant header adjacent said plurality of fuel cells, said heating system comprising a second heater comprising a second heating element disposed at least partially in said return coolant header adjacent said plurality of fuel cells, and wherein each coolant header is constructed and arranged to deliver coolant fluid to or from said plurality of fuel cells.

16. The system of claim 15 further comprising:
a cooling system to provide coolant to the fuel cell stack;
a power supply including at least one of an AC utility power source, a DC battery, and an output of the fuel cell stack;
a fuel cell stack output switch in series between the fuel cell stack output and a load connected to the fuel cell stack output; and
a power supply switch in series with the power supply.

17. The system of claim 16 wherein the heating system further comprises:
at least one switch connected between the power supply and said and second heater;
a coolant recirculation path in communication with said supply and return coolant headers:
a recirculation pump in the coolant recirculation path to deliver coolant between the headers;
a recirculation valve in the coolant recirculation path to direct coolant away from the coolant system and to the recirculation pump; and
a controller in communication with the at least one switch, the pump, and the valve, to control operation thereof.

18. The system of claim 17 wherein the cooling system comprises:
a coolant source;
a radiator;
coolant plumbing to carry coolant from the cooling system to the fuel cell stack; and
a pump to deliver coolant from the coolant source and radiator to the coolant headers.

* * * * *